US012808720B2

(12) United States Patent
Aoki et al.

(10) Patent No.: US 12,808,720 B2
(45) Date of Patent: Nov. 24, 2026

(54) ELECTROMAGNETIC WAVE DETECTION ELEMENT AND ELECTROMAGNETIC WAVE SENSOR HAVING THE SAME

(71) Applicant: TDK Corporation, Tokyo (JP)

(72) Inventors: Susumu Aoki, Tokyo (JP); Shinji Hara, Tokyo (JP); Naoki Ohta, Tokyo (JP); Maiko Kokubo, Tokyo (JP)

(73) Assignee: TDK Corporation, Tokyo (JP)

( * ) Notice: Subject to any disclaimer, the term of this patent is extended or adjusted under 35 U.S.C. 154(b) by 232 days.

(21) Appl. No.: 18/424,957

(22) Filed: Jan. 29, 2024

(65) Prior Publication Data

US 2024/0280409 A1 Aug. 22, 2024

(30) Foreign Application Priority Data

Feb. 21, 2023 (JP) ................................ 2023-025305

(51) Int. Cl.
*G01J 5/02* (2022.01)
*G01J 5/00* (2022.01)
*G01J 5/20* (2006.01)

(52) U.S. Cl.
CPC ....... *G01J 5/024* (2013.01); *G01J 2005/0077* (2013.01); *G01J 2005/202* (2013.01); *G01J 2005/206* (2013.01)

(58) Field of Classification Search
None
See application file for complete search history.

(56) References Cited

U.S. PATENT DOCUMENTS

2020/0408604 A1* 12/2020 Ohta ........................ G01J 1/02

FOREIGN PATENT DOCUMENTS

| | | | |
|---|---|---|---|
| JP | 2009-265094 | A | 11/2009 |
| JP | 2015-161642 | A | 9/2015 |
| JP | 2022-126582 | A | 8/2022 |
| WO | 2019/171465 | A | 9/2019 |

OTHER PUBLICATIONS

English machine translation of Office Action dated Oct. 6, 2026 for the corresponding Japanese Patent Application No. 2023-025305.

* cited by examiner

*Primary Examiner* — Erica S Lin
(74) *Attorney, Agent, or Firm* — Posz Law Group, PLC

(57) ABSTRACT

An electromagnetic wave detection element has: an electromagnetic wave detection portion; a conductive layer that is electrically connected to the electromagnetic wave detection portion; a conductive pillar having an end surface that is electrically connected to the conductive layer, wherein the end surface includes an inner region that is in contact with the conductive layer and an outer region that is positioned outside the inner region; and a dielectric layer that is positioned between at least a part of the outer region and the conductive layer.

17 Claims, 12 Drawing Sheets

ELECTROMAGNETIC WAVE DETECTION ELEMENT AND ELECTROMAGNETIC WAVE SENSOR HAVING THE SAME

FIELD

The present application is based on, and claims priority from, JP2023-25305, filed on Feb. 21, 2023, the disclosure of which is hereby incorporated by reference herein in its entirety.

The present disclosure relates to an electromagnetic wave detection element and an electromagnetic wave sensor having the electromagnetic wave detection element.

BACKGROUND

Electromagnetic wave sensors are known that detect electromagnetic waves such as infrared rays. JP2022-126582 discloses an electromagnetic wave detection element that has a thermistor element, a wiring layer that is electrically connected to the thermistor element, and a leg portion (a conductive pillar) that is electrically connected to the wiring layer. A thermistor element includes a thermistor film whose electric resistance changes depending on temperature. The temperature of the thermistor film changes due to electromagnetic waves that are incident from the outside. The temperature of an object to be measured correlates with radiation energy that is emitted from the object to be measured (the Stefan-Boltzmann law). Based on this principle, the temperature of the object to be measured can be measured from the electric resistance of the thermistor film.

SUMMARY

In order to ensure the measurement accuracy of an electromagnetic wave detection element, it is desirable to limit any temperature change of the thermistor film that arises from causes other than radiation energy. To do so, it is preferable to make any conductive layer thin and thereby limit the heat dissipation from the thermistor element to the conductive layer. However, due to the complicated route of the conductive layer near the connection between the conductive layer and the conductive pillar, consistent formation of the conductive layer may be inhibited if the conductive layer is made thin.

It is desirable to provide an electromagnetic wave detection element that allows consistent formation of a conductive layer.

According to an aspect of the present disclosure, an electromagnetic wave detection element comprises:

- an electromagnetic wave detection portion;
- a conductive layer that is electrically connected to the electromagnetic wave detection portion;
- a conductive pillar having an end surface that is electrically connected to the conductive layer, wherein the end surface includes an inner region that is in contact with the conductive layer and an outer region that is positioned outside the inner region; and
- a dielectric layer that is positioned between at least a part of the outer region and the conductive layer.

DETAILED DESCRIPTION

Figure 1:
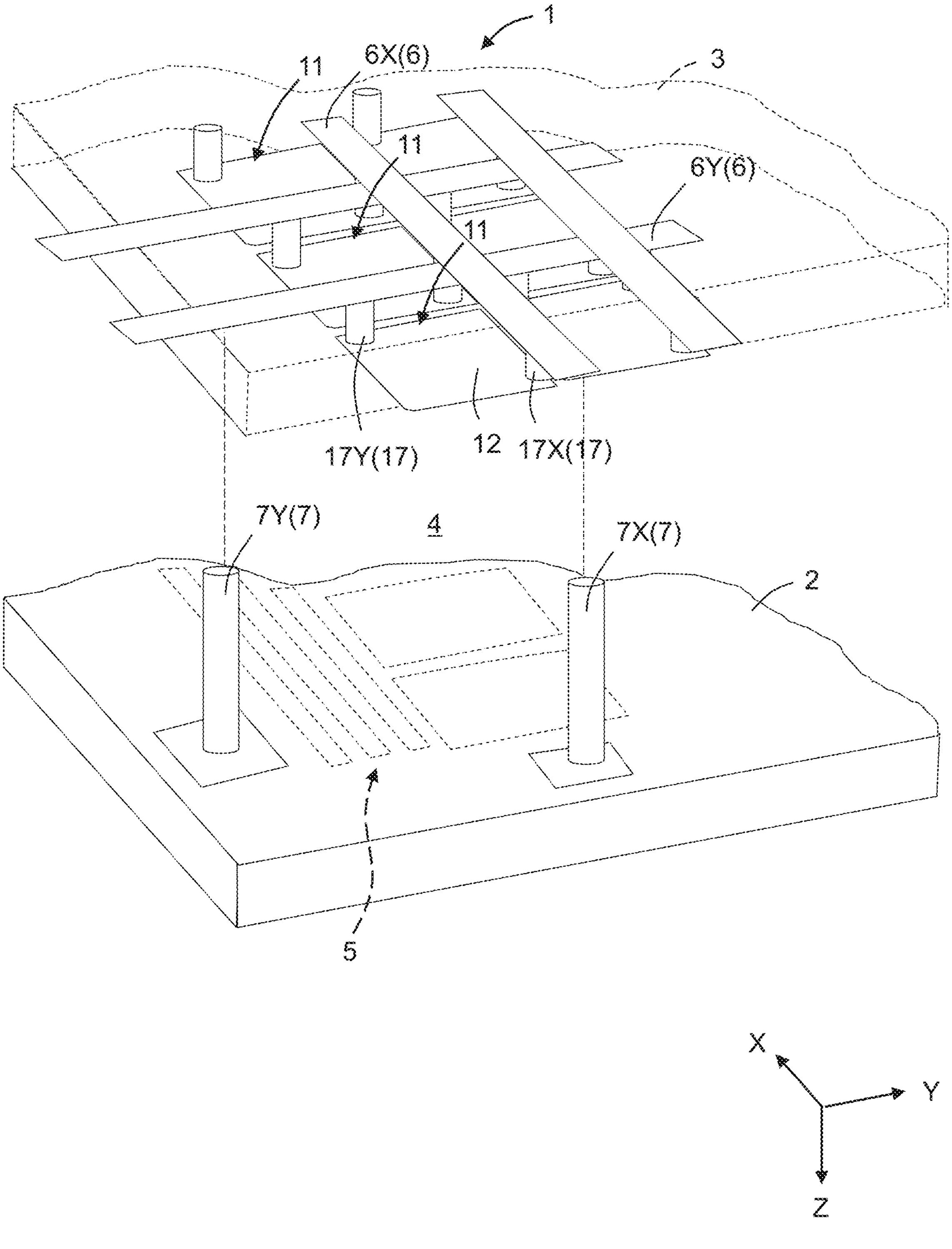
FIG. 1 is an exploded perspective view of an infrared sensor according to a first embodiment of the present disclosure.

Some embodiments of the electromagnetic wave detection element and the electromagnetic wave sensor of the present disclosure will be described with reference to the drawings. In the following description and drawings, the X-direction and the Y-direction are parallel to the main surface of first substrate 2 and the main surface of second substrate 3. The X-direction corresponds to the direction of rows of the array of electromagnetic wave detection elements 11 and the Y-direction corresponds to the direction of columns of the array of electromagnetic wave detection elements 11. The main surfaces refer to the surface of first substrate 2 and the surface of second substrate 3 that face each other. The X-direction and the Y-direction are perpendicular to each other. The Z-direction is perpendicular to both the X-direction and the Y-direction and is also perpendicular to the main surfaces of first substrate 2 and second substrate 3. The upward Z-direction refers to the direction that is directed from second substrate 3 to first substrate 2 and the downward Z-direction refers to the direction that is directed from first substrate 2 to second substrate 3. In the drawings, the direction that is directed from second substrate 3 to first substrate 2 is shown as the Z-direction.

The following embodiments are directed to an infrared sensor in which more than one of electromagnetic wave detection element 11 are arranged in a two-dimensional array. An infrared sensor mainly detects infrared rays having long wavelengths. The infrared rays having long wavelengths have wavelengths of about 8 to 14 μm. Such an infrared sensor may be mainly used for an image sensor of an infrared camera. An infrared camera may be used for a night vision scope or night vision goggles in the dark and may also be used to measure the temperature of a human or an object. Furthermore, an infrared sensor in which electromagnetic wave detection elements are arranged in one dimension may be used as a sensor that measures various kinds of temperature or temperature distribution. Although explanation is here omitted, an infrared sensor in which electromagnetic wave detection elements are arranged in one dimension is also included in the scope of the present disclosure. Electromagnetic wave detection element 11 of the present embodiment includes a temperature detection element having a thermistor film, but any type of electromagnetic wave detection element including temperature detection elements of a thermopile (thermocouple) type, of a pyroelectric type, and of a diode type may be applied. In addition, an element such as a photodiode that directly detects electromagnetic waves may be used for the electromagnetic wave detection element. The electromagnetic waves to be detected are not limited to infrared rays and, for example, terahertz waves having a wavelength of from 100 μm to 1 mm are included among the electromagnetic waves to be detected.

First Embodiment

General Configuration

FIG. 1 is an exploded perspective view of infrared sensor 1 of the first embodiment of the present disclosure, in which first substrate 2 and second substrate 3 are separately shown. Infrared sensor 1 has first substrate 2 and second substrate 3 that faces first substrate 2. A side wall (not illustrated) is connected to first substrate 2 and second substrate 3 such that first substrate 2, second substrate 3, and the side wall form tightly-closed inner space 4. Inner space 4 is maintained at a negative pressure or as a vacuum. Thus, the convection of gas in inner space 4 is prevented or limited and thermal influence on electromagnetic wave detection elements 11 can be mitigated.

First substrate 2 has a silicon substrate and an insulating layer (both not illustrated). Elements 5 such as a readout IC (ROIC), wiring (not illustrated), and so on are formed on the surface of the silicon substrate or inside the insulating layer. The ROIC includes elements such as a regulator, an A/D converter and a multiplexer. Second substrate 3 is mainly formed of a silicon substrate. Leads 6, which will be described later, are formed on second substrate 3.

Electromagnetic wave detection elements 11 are provided in inner space 4. Electromagnetic wave detection elements 11 form a two-dimensional array of a lattice pattern that is formed by rows that extend in the X-direction and columns that extend in the Y-direction. Each row is formed of electromagnetic wave detection elements 11 that are arranged in the X-direction at a constant interval, and each column is formed of electromagnetic wave detection elements 11 that are arranged in the Y-direction at a constant interval. Electromagnetic wave detection portion 12 of each electromagnetic wave detection element 11 forms one cell or one pixel of the array. The number of the rows and the columns of the array may be but is not limited to, for example, 640 rows×480 columns or 1024 rows×768 columns. It should be noted that wiring layer 13, which will be described later, is omitted in FIG. 1.

Leads 6 are formed on second substrate 3. Leads 6 connect electric connection members 7, which will be described later, to electromagnetic wave detection elements 11 and supply sensing current to electromagnetic wave detection elements 11. Leads 6 are formed of a conductive material such as copper. Leads 6 are provided for each row and each column of electromagnetic wave detection elements 11 and are formed in a lattice pattern. Specifically, leads 6 are constituted of row leads 6X that extend in the direction of the rows (the X-direction) and column leads 6Y that extend in the direction of the columns (the Y-direction). Row leads 6X sequentially connect to electromagnetic wave detection elements 11 that are included in the corresponding row, and column leads 6Y sequentially connect to electromagnetic wave detection elements 11 that are included in the corresponding column. Row leads 6X extend at a different level in the Z-direction than column leads 6Y so as to allow crossing without direct electrical contact.

First substrate 2 and second substrate 3 are connected to each other by electric connection members 7. Each electric connection member 7 is a conductor having a pillar shape with a circular cross section and may be formed, for example, by plating. Elements 5 such as the ROIC are connected to electric connection members 7 via the inner wiring of first substrate 2. A portion of electric connection members 7 is connected to row leads 6X and the remaining electric connection members 7 are connected to column leads 6Y. Although not illustrated, electric connection members 7X, connected to respective row leads 6X, are alternately arranged first on one side and then on the other side of row leads 6X. Similarly, electric connection members 7Y, connected to respective column leads 6Y, are alternately arranged first on one side and then on the other side of column leads 6Y. This arrangement can ensure sufficient cross-sections of electric connection members 7 while suppressing an increase in the size of infrared sensor 1.

Configuration of Electromagnetic Wave Detection Element 11

Figure 2A:
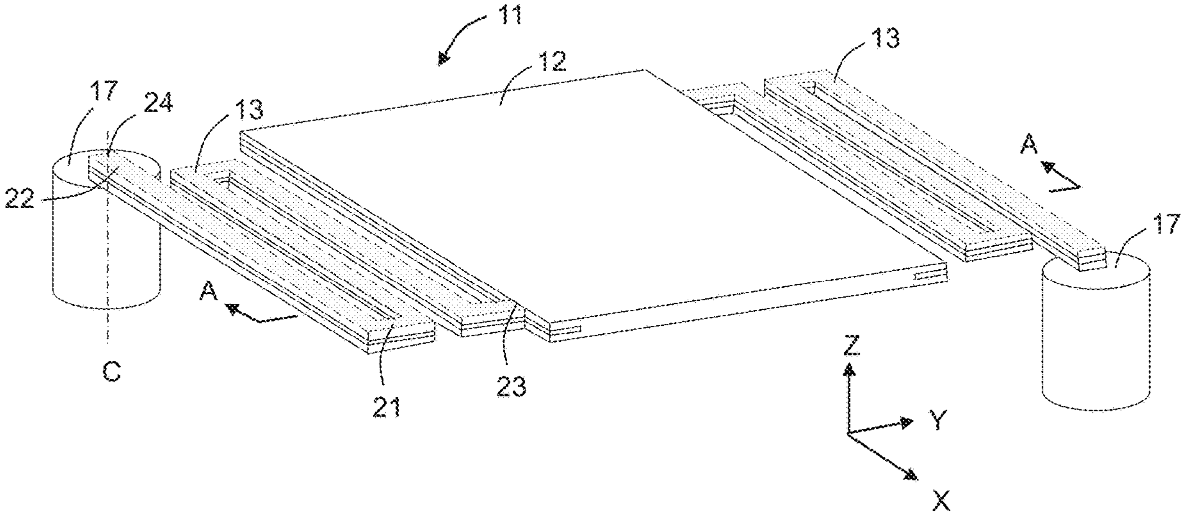
FIGS. 2A and 2B are conceptual views of an electromagnetic wave detection element.
Figure 2B:
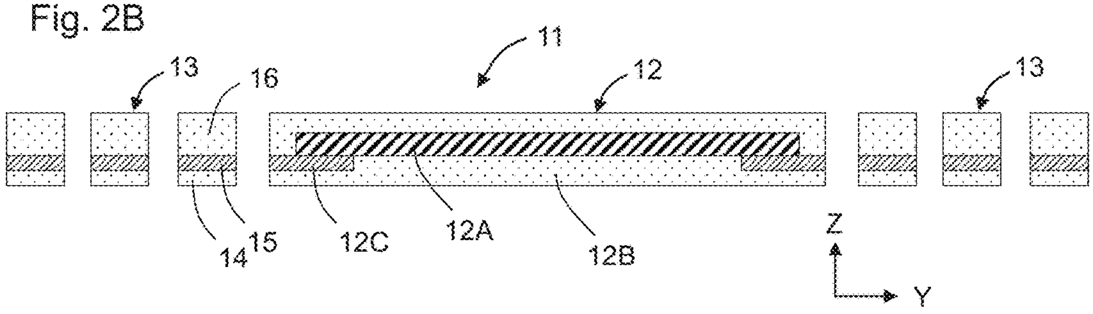
Figure 3A:
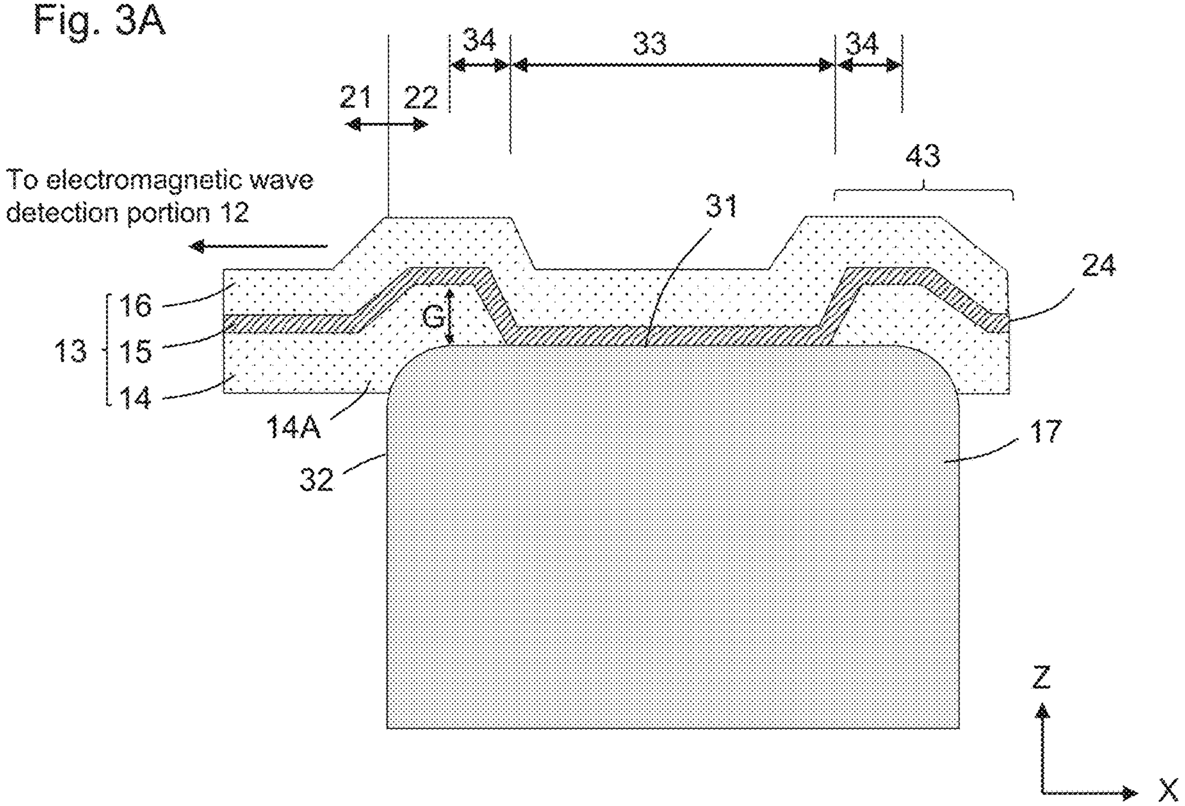
FIGS. 3A and 3B are conceptual views illustrating the configuration of the connection between a conductive pillar and the conductive layer.
Figure 3B:
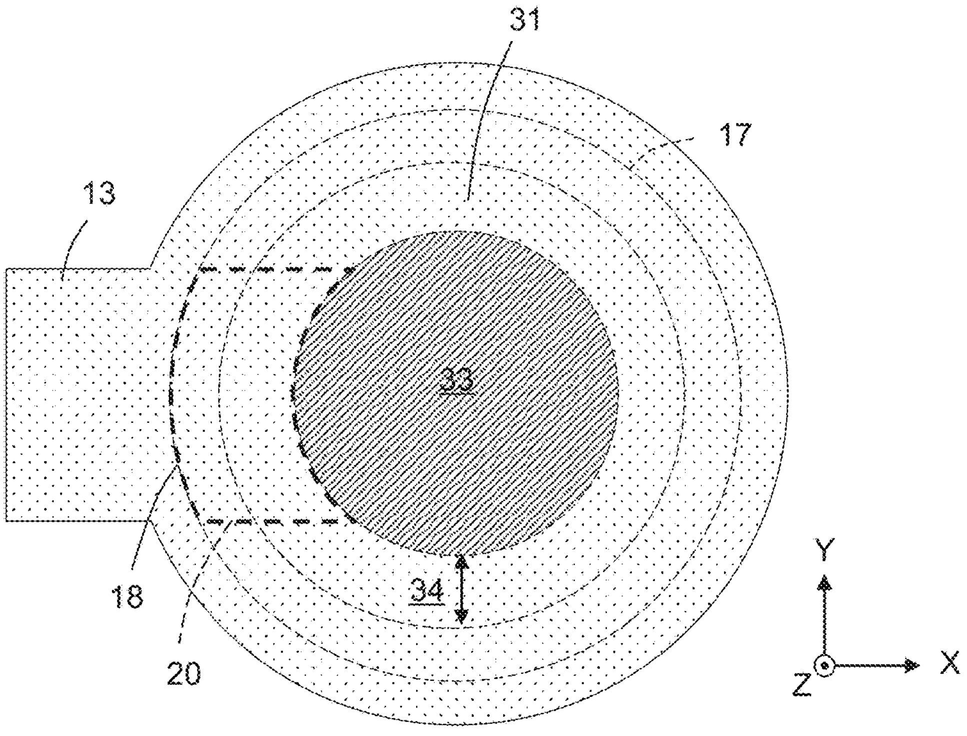

FIG. 2A is a perspective view of electromagnetic wave detection element 11, and FIG. 2B is a sectional view of electromagnetic wave detection element 11 taken along line A-A in FIG. 2A. FIG. 3A is a sectional view illustrating the configuration of the connection between conductive pillar 17 and conductive layer 15, and FIG. 3B is a plan view of the connection as seen in the downward Z-direction in FIG. 3A, showing inner region 33 of conductive pillar 17 which will be described later. The detailed configuration of the connection between conductive pillar 17 and conductive layer 15 is omitted in FIG. 2A. For convenience, FIGS. 2A, 2B, and FIG. 3A are illustrated upside down with respect to FIG. 1. Electromagnetic wave detection element 11 has electromagnetic wave detection portion 12, two wiring layers 13 that are connected to electromagnetic wave detection portion 12, and two conductive pillars 17 connected to respective two wiring layers 13. Two wiring layers 13 have the same shape and configuration and two conductive pillars 17 also have the same shape and configuration. Thus, the following description will relate to one of wiring layers 13 and one of conductive pillars 17.

Electromagnetic wave detection portion 12 includes temperature detection element 12A, dielectric layer 12B that covers at least a part of temperature detection element 12A, and conductive pad layers 12C that are electrically connected to temperature detection element 12A. Temperature detection element 12A is a thermistor film having, for example, a square shape or a rectangular shape. The planar shape of the thermistor film is not limited to a square or rectangle and may be any shape. The thermistor film may be a film that is formed of, for example, vanadium oxide, amorphous silicon, polycrystalline silicon, an oxide of a spinel crystal structure that contains manganese, titanium dioxide, or yttrium-barium-copper oxide. Dielectric layer 12B is formed of aluminum nitride, silicon nitride, aluminum oxide, or silicon oxide, and works to absorb electromagnetic waves. Pad layers 12C are provided to electrically connect conductive layer 15, which will be described later, to temperature detection element 12A.

As shown in FIGS. 2B and FIG. 3A, wiring layer 13 has conductive layer 15, first dielectric layer 14 that covers one of the surfaces of conductive layer 15 (the surface that faces second substrate 3), and second dielectric layer 16 that covers the other surface of conductive layer 15 (the surface that faces first substrate 2). Conductive layer 15 includes linear portion 21 that extends from first end 23, and end portion 22 that is connected to linear portion 21 and that extends to second end 24. In the example shown in FIG. 3A, linear portion 21 extends from first end 23 to conductive pillar 17. Linear portion 21 is here formed in a meandering pattern, but the shape of linear portion 21 is not particularly limited. First and the second dielectric layers 14 and 16 that cover linear portion 21 have substantially the same planar shape as linear portion 21.

First end 23 of conductive layer 15 is connected to electromagnetic wave detection portion 12, and more specifically, to pad layer 12C of electromagnetic wave detection portion 12. Second end 24 of conductive layer 15 is positioned on the path along conductive layer 15 on the side opposite to first end 23 in relation to the electric connection between conductive pillar 17 and conductive layer 15 (in the present embodiment, corresponding to inner region 33 to be described later). However, second end 24 is positioned outside the outer circumference of conductive pillar 17 as seen in the Z-direction. Conductive layer 15 is formed of a conductive material such as titanium, tantalum, tungsten, aluminum, titanium nitride, tantalum nitride, chromium nitride, or zirconium nitride. In view of manufacturing processes, first dielectric layer 14 and second dielectric layer 16 may be formed of the same material as dielectric layer 12B that covers temperature detection element 12A. Accordingly, first dielectric layer 14 and second dielectric layer 16 are formed of aluminum nitride, silicon nitride, aluminum oxide, silicon oxide, or the like.

Conductive pillars 17 support electromagnetic wave detection portions 12 and supply sensing current to electromagnetic wave detection portions 12. Each electromagnetic wave detection portion 12 is supported by second substrate 3 via two conductive pillars 17. Electromagnetic wave detection portion 12 is supported by two conductive pillars 17 at two diagonal corners of electromagnetic wave detection portion 12. Each conductive pillar 17 is a conductor having a pillar shape with a circular cross section similar to electric connection members 7 and may be formed, for example, by plating. Each conductive pillar 17 has long axis C. Long axis C extends in the Z-direction but may be slightly tilted relative to the Z-direction. Long axis C of conductive pillar 17 is directed such that it intersects two surfaces of conductive layer 15 that are opposite to each other in the thickness direction thereof. As shown in FIG. 1, one conductive pillar 17X out of two conductive pillars 17 is connected to row lead 6X and the other conductive pillar 17Y is connected to column lead 6Y. Two conductive pillars 17X and 17Y extend in the upward Z-direction (downward in FIG. 1) toward first substrate 2 from row lead 6X and column lead 6Y, respectively, and terminate between first substrate 2 and second substrate 3. Accordingly, electromagnetic wave detection portion 12 is suspended in inner space 4 with gaps in the Z-direction both from first substrate 2 and second substrate 3. The path of heat transfer from heat sources such as elements 5 that are provided in first substrate 2 is substantially limited to the route along first substrate 2, electric connection members 7, leads 6, and conductive pillars 17, and the influence of the heat generated by heat sources such as elements 5 on electromagnetic wave detection portion 12 is thereby limited.

Infrared sensor 1 thus constructed operates, for example, in the following manner. Infrared rays that are incident to infrared sensor 1 via second substrate 3 enter the array of electromagnetic wave detection portions 12. The incident infrared rays are absorbed by dielectric layer 12B and temperature detection element 12A, whereby the temperature of temperature detection element 12A changes and thus causing a change in the electric resistance of temperature detection element 12A. Sensing current sequentially flows in electric connection member 7X, selected row lead 6X, conductive pillar 17 that is connected to selected row lead 6X, electromagnetic wave detection portion 12, conductive pillar 17Y that is connected to column lead 6Y, column lead 6Y, and electric connection members 7Y. The change in the electric resistance of each temperature detection element 12A that is connected to selected row lead 6X is extracted as a change in voltage by the ROIC in first substrate 2. The ROIC converts the voltage signal to brightness temperature. Row leads 6X are sequentially selected by the ROIC, and the change in electric resistance is outputted from electromagnetic wave detection portions 12 (temperature detection elements 12A) that are connected to the selected row leads 6X and is sequentially converted to brightness temperature. All electromagnetic wave detection portions 12 are scanned in this manner and image data for one picture is obtained.

As shown in FIG. 3A, conductive pillar 17 has end surface 31 that is electrically connected to conductive layer 15. End surface 31 is substantially circular and substantially flat. A portion near the boundary between end surface 31 and side 32 may be slightly rounded as shown in the figure, and the rounded portion is not included in end surface 31 but included in side 32. End surface 31 has inner region 33 that is in contact with conductive layer 15 and outer region 34 that is positioned outside inner region 33.

A dielectric layer (a part of first dielectric layer 14) is provided between the portion of outer region 34 around the entire circumference thereof (the entire outer region 34) and conductive layer 15. More specifically, gap G is provided in the Z-direction between conductive layer 15 and the portion of outer region 34 around the entire circumference thereof, and gap G is filled with a substantially ring-shaped dielectric layer (a part of first dielectric layer 14). On the other hand, first dielectric layer 14 is not provided between inner region 33 and conductive layer 15, and conductive layer 15 is physically in contact with end surface 31 of conductive pillar 17. Although inner region 33 is a circle that is substantially concentric with end surface 31, the shape of inner region 33 is not limited and may be an ellipse, a polygon, or the like. Alternatively, inner region 33 may be eccentric with end surface 31. However, as seen in the Z-direction, inner region 33 preferably does not include at least portion 18 (see FIG. 3B) where conductive pillar 17 is in contact with wiring layer 13. In other words, as seen in the direction (the Z-direction) that is parallel to long axis C of conductive pillar 17, the dielectric layer (a part of first dielectric layer 14) that is positioned between outer region 34 and conductive layer 15 may be provided at least at a position that is between inner region 33 and first end 23 (region 20 in FIG. 3B) and that is along linear portion 21. In the example shown in FIG. 3B, conductive layer 15, which has substantially the same planar shape as wiring layer 13, envelops conductive pillar 17 as seen in the Z-direction, and second end 24 of conductive layer 15 is positioned outside the outer circumference of conductive pillar 17 as seen in the Z-direction. However, second end 24 of conductive layer 15 may alternatively coincide with the outer circumference of conductive pillar 17 as seen in the Z-direction. Alternatively, the portion of conductive layer 15 that faces conductive pillar 17 may be smaller than conductive pillar 17 as seen in the Z-direction, and second end 24 of conductive layer 15 may be positioned inside the outer circumference of conductive pillar 17 as seen in the Z-direction.

Manufacturing Method of Electromagnetic Wave Detection Element 11

Figure 4A:
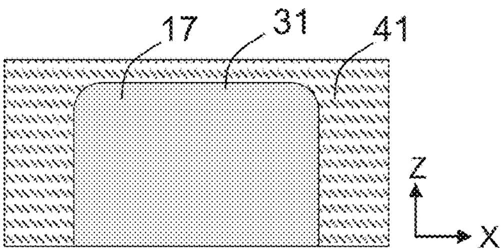
FIGS. 4A and 4B are views illustrating the manufacturing method of the electromagnetic wave detection element.
Figure 4B:
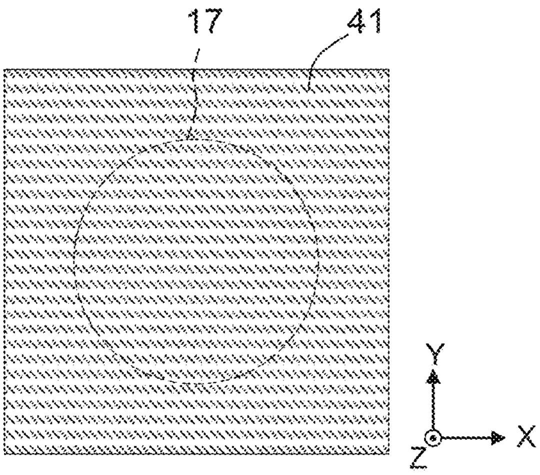

A manufacturing method of electromagnetic wave detection element 11 is now described with reference to FIGS. 4A to 11B. FIGS. 4A, 5A, 6A, 7A, 8A, 9A, 10A, and 11A show sectional views of the connection between conductive pillar 17 and conductive layer 15 and correspond to FIG. 3A. FIGS. 4B, 5B, 6B, 7B, 8B, 9B, 10B, and 11B show plan views of the connection and correspond to FIG. 3B. The outer circumference of conductive pillar 17 is omitted in FIGS. 8B, 9B, 10B, and 11B. The processes shown in FIGS. 4A to 11B are performed as wafer processes. As shown in FIGS. 1, 4A, and 4B, conductive pillars 17 are first formed on row leads 6X and column leads 6Y of second substrate 3 by plating, and conductive pillars 17, including end surfaces 31, are then covered by organic sacrifice layer 41 that is formed of a resist.

Figure 5A:
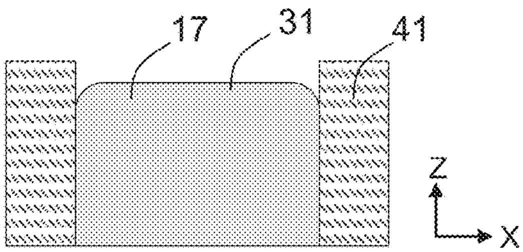
FIGS. 5A and 5B are views illustrating the manufacturing method of the electromagnetic wave detection element.
Figure 5B:
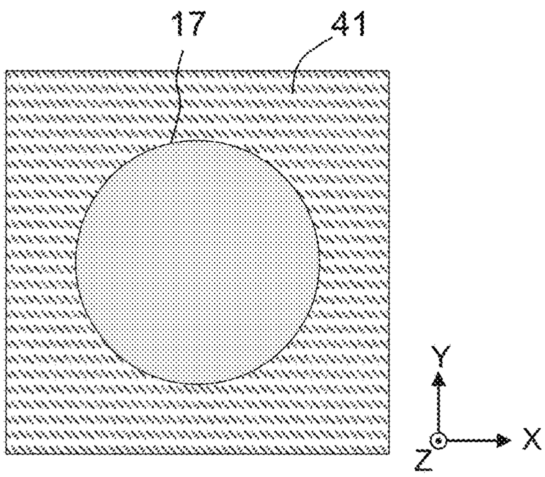
Figure 6A:
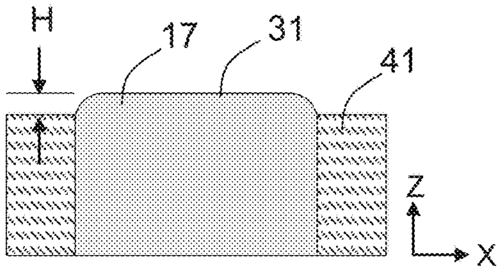
FIGS. 6A and 6B are views illustrating the manufacturing method of the electromagnetic wave detection element.
Figure 7A:
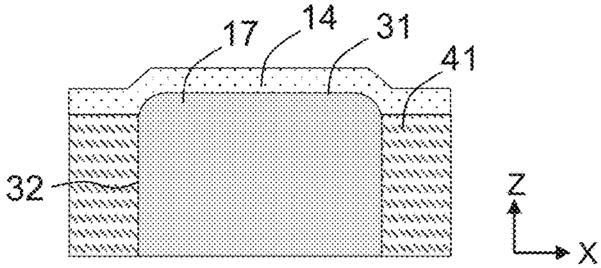
FIGS. 7A and 7B are views illustrating the manufacturing method of the electromagnetic wave detection element.
Figure 6B:
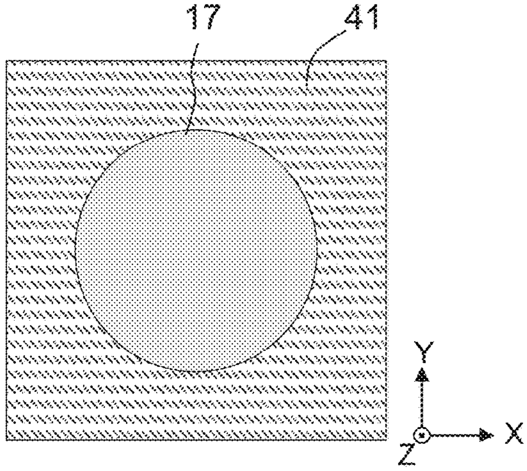
Figure 7B:
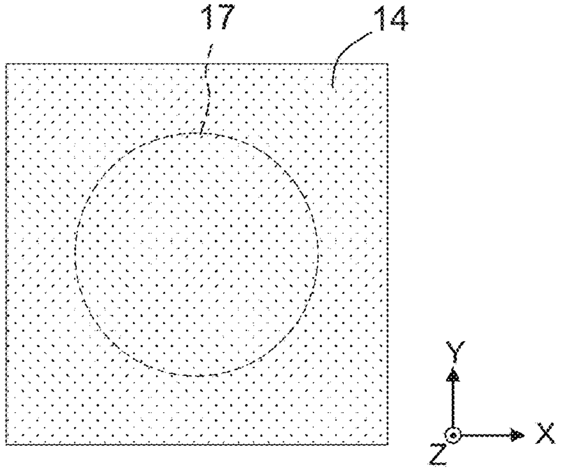

Next, as shown in FIGS. 5A and 5B, organic sacrifice layer 41 that is deposited on conductive pillars 17 is removed by exposure and development. End surfaces 31 of conductive pillars 17 are thus exposed. Next, as shown in FIGS. 6A and 6B, organic sacrifice layer 41 is heated and cured. This process allows wiring layer 13 to be stably formed on organic sacrifice layer 41 in a later process. Organic sacrifice layer 41 shrinks when it is cured and a part of conductive pillar 17 protrudes from the upper surface of organic sacrifice layer 41. Next, as shown in FIGS. 7A and 7B, first dielectric layer 14 is formed on the entire surface of the wafer. First dielectric layer 14 is thereby deposited on organic sacrifice layer 41 and conductive pillars 17. First dielectric layer 14 has side dielectric layer 14A that faces the upper part of side 32 of conductive pillar 17. Side dielectric layer 14A is integrated with the dielectric layer (a part of first dielectric layer 14) that is positioned between outer region 34 and conductive layer 15 via another part of first dielectric layer 14. Side dielectric layer 14A is in contact with the upper part of side 32 of conductive pillar 17.

Figure 8A:
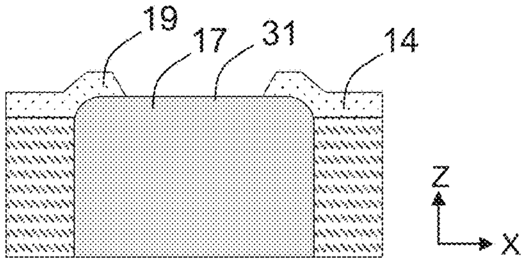
FIGS. 8A and 8B are views illustrating the manufacturing method of the electromagnetic wave detection element.
Figure 8B:
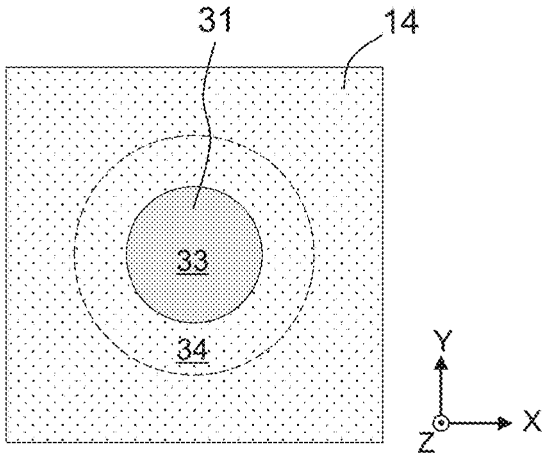

Next, as shown in FIGS. 8A and 8B, a part of first dielectric layer 14 is removed by milling to again expose end surface 31 of conductive pillar 17. This process allows conductive layer 15 to be formed such that conductive layer 15 is in contact with end surface 31 of conductive pillar 17 in the next step. In this process, only first dielectric layer 14 that covers inner region 33 of end surface 31 of conductive pillar 17 is removed such that first dielectric layer 14 that covers the other regions including outer region 34 remains. The reason will be described later. It should be noted that the broken line in FIG. 3B that shows the boundary of inner region 33 corresponds to the aperture of a mask that is used for the milling in this step.

Figure 9A:
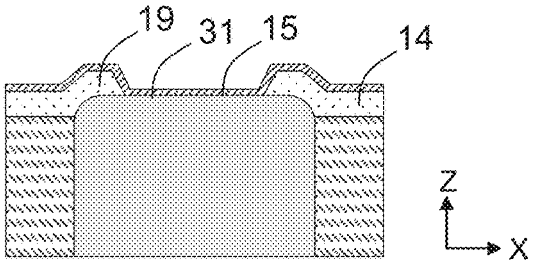
FIGS. 9A and 9B are views illustrating the manufacturing method of the electromagnetic wave detection element.
Figure 9B:
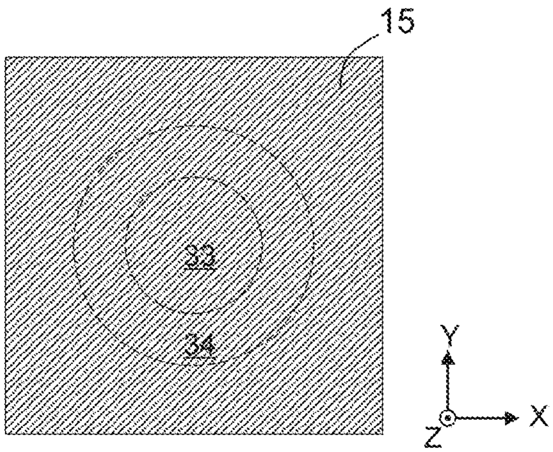
Figure 10A:
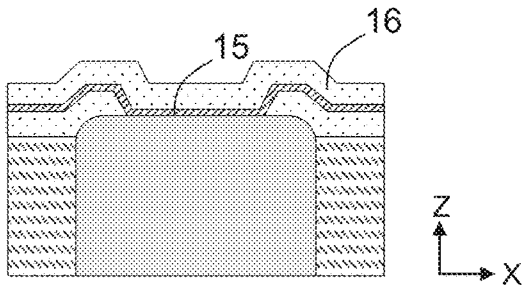
FIGS. 10A and 10B are views illustrating the manufacturing method of the electromagnetic wave detection element.
Figure 11A:
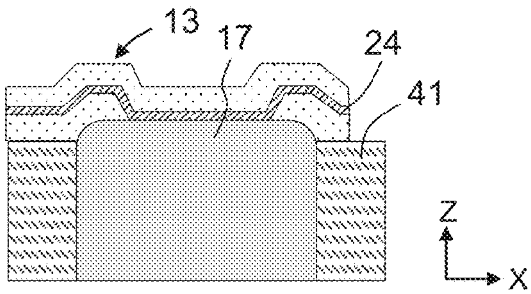
FIGS. 11A and 11B are views illustrating the manufacturing method of the electromagnetic wave detection element.
Figure 10B:
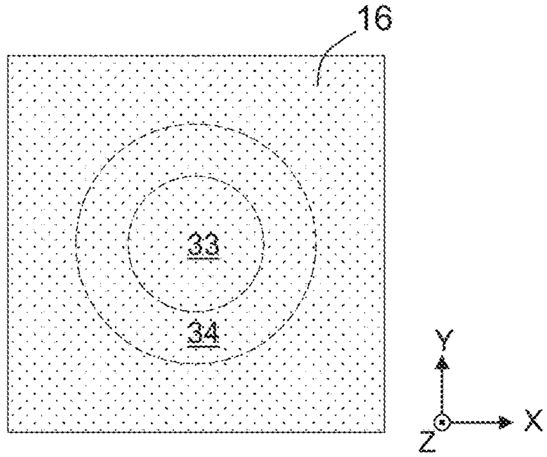
Figure 11B:
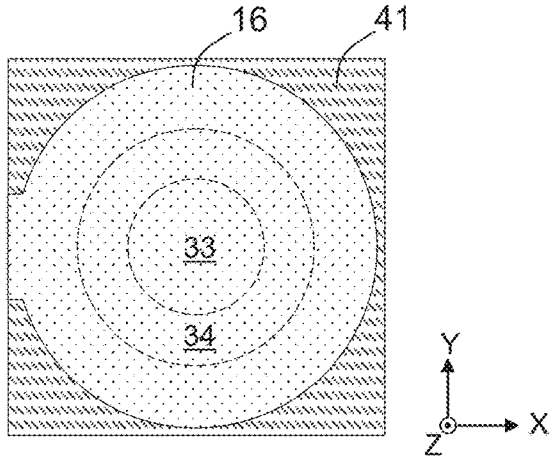

Next, as shown in FIGS. 9A and 9B, conductive layer 15 is formed on the entire surface of the wafer. Conductive layer 15 is thereby deposited on first dielectric layer 14 and end surfaces 31 of conductive pillars 17. Next, as shown in FIGS. 10A and 10B, second dielectric layer 16 is formed on the entire surface of the wafer. Second dielectric layer 16 is thereby deposited on conductive layer 15. Next, as shown in FIGS. 11A and 11B, a part of first dielectric layer 14, a part of conductive layer 15 and a part of second dielectric layer 16 are removed by milling to form wiring layer 13 having a meandering pattern. Then, organic sacrifice layer 41 is removed, and second substrate 3 is connected to first substrate 2 via the side wall. First substrate 2 is formed on another wafer. Infrared sensor 1 shown in FIG. 1 that is provided with electromagnetic wave detection elements 11 is thus obtained by these processes.

In the present embodiment, due to the structure for connecting conductive layer 15 to conductive pillar 17, conductive layer 15 is less likely to have narrow portion 42 having a locally reduced thickness. The reason is demonstrated by comparing the present embodiment to Comparative Example 1. FIGS. 12A, 12B, 13A, and 13B illustrate a manufacturing method of electromagnetic wave detection elements 11 of Comparative Example 1, wherein FIGS. 12A and 12B correspond to FIGS. 8A and 8B and FIGS. 13A and 13B correspond to FIGS. 9A and 9B. The other processes of Comparative Example 1 are the same as the processes of the present embodiment shown in FIGS. 4A to 7B and 10A to 11B. Therefore, the processes of Comparative Example 1 are performed in the order of FIGS. 4A and 4B, 5A and 5B, 6A and 6B, 7A and 7B, 12A and 12B, 13A and 13B, 10A and 10B, and 11A and 11B.

Figure 12A:
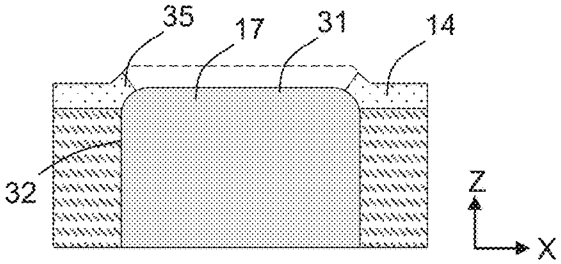
FIGS. 12A and 12B are views illustrating the manufacturing method of an electromagnetic wave detection element of Comparative Example 1.
Figure 12B:
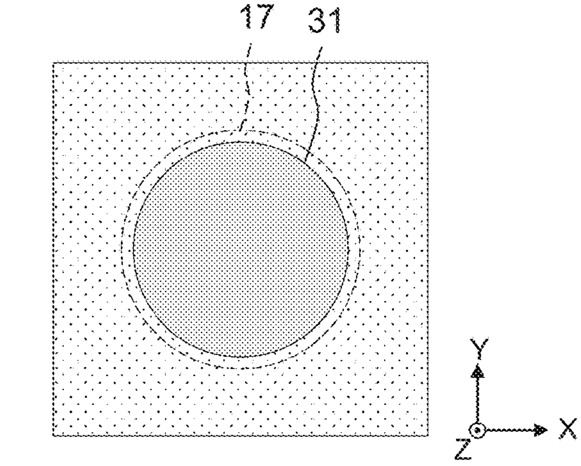

As shown in FIGS. 12A and 12B, in Comparative Example 1, first dielectric layer 14 is entirely removed from end surface 31 of conductive pillar 17 to thereby expose the entire portion of end surface 31 of conductive pillar 17. When first dielectric layer 14 is deposited as shown by the broken line in FIG. 12A (in the step corresponding to FIGS. 7A and 7B), the portion of first dielectric layer 14 on end surface 31 of conductive pillar 17 protrudes from the portion of first dielectric layer 14 on the upper surface of organic sacrifice layer 41. When only the entire portion of end surface 31 of conductive pillar 17 is exposed in this state, thorn-shaped portion 35 having a sharp edge is easily generated along the outer circumference of end surface 31 of conductive pillar 17. Thorn-shaped portion 35 is less likely to occur if the removed portion of first dielectric layer 14 is extended outwardly, but in that case, first dielectric layer 14 is removed from side 32 of conductive pillar 17 and the strength of the connection between wiring layer 13 and conductive pillar 17 may be reduced. For this reason, thorn-shaped portion 35 is easily generated when end surface 31 of conductive pillar 17 is entirely exposed while the connection between first dielectric layer 14 and conductive pillar 17 is ensured.

Figure 13A:
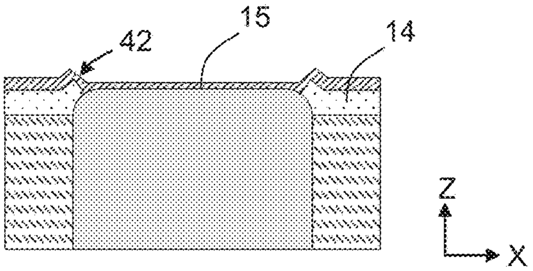
FIGS. 13A and 13B are views illustrating the manufacturing method of the electromagnetic wave detection element of Comparative Example 1.
Figure 13B:
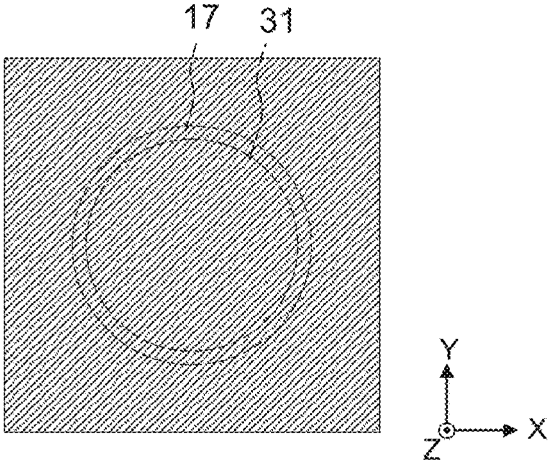

Accordingly, as shown in FIGS. 13A and 13B, narrow portion 42 having a thin film thickness is easily generated in conductive layer 15 that is deposited on thorn-shaped portion 35 along thorn-shaped portion 35 and makes the shape of conductive layer 15 inconsistent. Since electric resistance increases in narrow portion 42 and the shape of thorn-shaped portion 35 tends to vary for each electromagnetic wave detection element 11, the electric resistance of conductive layer 15 easily varies depending on electromagnetic wave detection elements 11. In addition, the variation of the thickness of plating is far greater than the variation of the thickness of organic sacrifice layer 41, and difference in level H (see FIG. 6A) between conductive pillar 17 that is formed by plating and organic sacrifice layer 41 also tends to vary. As a result, the shape of first dielectric layer 14 (the shape shown by the broken line in FIG. 12A) tends to vary for each electromagnetic wave detection element 11, and the shape of thorn-shaped portion 35 tends to further vary depending on electromagnetic wave detection elements 11. The variation of the electric resistance of conductive layer 15 for each electromagnetic wave detection element 11 causes variation of the output of electromagnetic wave detection elements 11 and adversely affects the performance and the reliability of the electromagnetic wave sensor.

In contrast, in the present embodiment, as shown in FIGS. 8A and 8B, only first dielectric layer 14 of inner region 33 is removed, and first dielectric layer 14 of outer region 34 is maintained. Although the remaining part of first dielectric layer 14 produces protruding part 19 that protrudes from end surface 31 of conductive pillar 17, protruding part 19 extends inward as compared to the comparative example 1 and is thereby formed in a smoother shape than thorn-shaped portion 35. Accordingly, as shown in FIG. 9A, conductive layer 15 that is deposited on top of protruding part 19 is also formed in a smooth shape. As a result, narrow portion 42 is less easily generated, thereby allowing a more consistent formation of the shape of conductive layer 15.

Figure 14A:
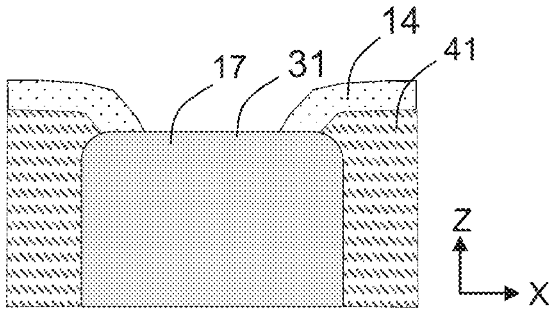
FIGS. 14A and 14B are views illustrating the manufacturing method of an electromagnetic wave detection element in which the upper surface of an organic sacrifice layer protrudes above the end surface of a conductive pillar.
Figure 14B:
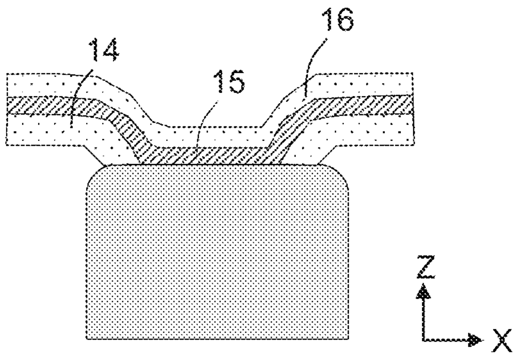
Figure 15A:
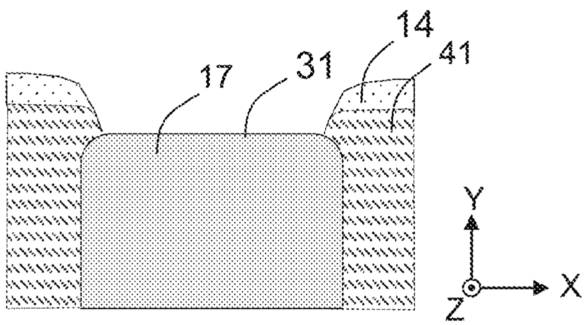
FIGS. 15A and 15B are views illustrating the manufacturing method of an electromagnetic wave detection element of Comparative Example 2.
Figure 15B:
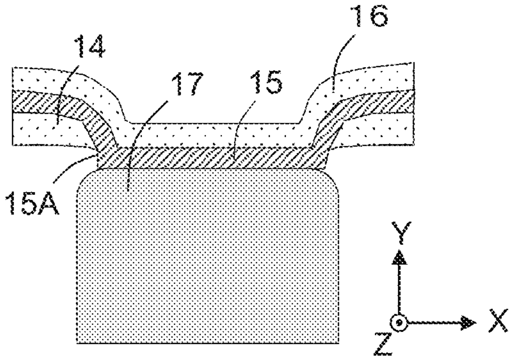

Since the thickness of plating greatly varies as described previously, when organic sacrifice layer 41 is cured and shrinks, organic sacrifice layer 41 may, contrary to FIGS. 6A and 6B, protrude above end surface 31 of conductive pillar 17. Due to the variation of the thickness of plating in any single wafer, there is the possibility that organic sacrifice layer 41 may protrude at one location of the wafer while conductive pillar 17 may protrude at another location of the wafer. FIGS. 14A to 14B and FIGS. 15A and 15B show sectional views of the connection between conductive pillar 17 and conductive layer 15 when organic sacrifice layer 41 protrudes above end surface 31 of conductive pillar 17 in the present embodiment and in Comparative Example 2, respectively. FIG. 14A and FIG. 15A correspond to FIG. 8A, and FIG. 14B and FIG. 15B correspond to FIG. 3A. As shown in FIG. 14B and FIG. 15B, conductive layer 15 is formed in a shape that is convex in the downward Z-direction.

As shown in FIG. 15A, in Comparative Example 2, end surface 31 of conductive pillar 17 is entirely exposed. Therefore, when conductive layer 15 is formed along both first dielectric layer 14 and end surface 31 of conductive pillar 17 over the entire surface of the wafer in the next step, conductive layer 15 is formed on first dielectric layer 14, end surface 31 of conductive pillar 17, and the portion of organic sacrifice layer 41 that is higher than conductive pillar 17, as shown in FIG. 15B. When organic sacrifice layer 41 is removed thereafter in the processes that are shown in FIGS. 10A to 11B, part 15A of the lower surface of conductive layer 15 is exposed. Since the thickness of plating varies depending on the location on any single wafer, as described previously, although the lower surface of conductive layer 15 may be covered by first dielectric layer 14 when electromagnetic wave detection element 11 has relatively high conductive pillars 17 (FIG. 13A), part 15A of the lower surface of conductive layer 15 may be exposed when electromagnetic wave detection element 11 has relatively low conductive pillars 17 (FIG. 15B). Therefore, the amount of heat dissipation from conductive layer 15 may vary for each electromagnetic wave detection element 11, and the measurement accuracy may be affected.

In the present embodiment, as shown in FIG. 14B, the portion of organic sacrifice layer 41 that is higher than conductive pillar 17 is entirely covered by first dielectric layer 14, and the lower surface of conductive layer 15 is thereby prevented from being exposed (FIG. 14B). In addition, when conductive pillars 17 are relatively high, the lower surface of conductive layer 15 is entirely covered by first dielectric layer 14 (FIG. 3A). Accordingly, the variation of the amount of heat dissipation from conductive layer 15 for each electromagnetic wave detection element 11 and the influence on measurement accuracy are limited. Although not illustrated, when the upper surface of organic sacrifice layer 41 and end surface 31 of conductive pillar 17 substantially match in the Z-direction in FIG. 6A (when there is substantially no difference in level between the upper surface of organic sacrifice layer 41 and end surface 31 of conductive pillar 17), the lower surface of conductive layer 15 is entirely covered by first dielectric layer 14.

Second Embodiment

Figure 16A:
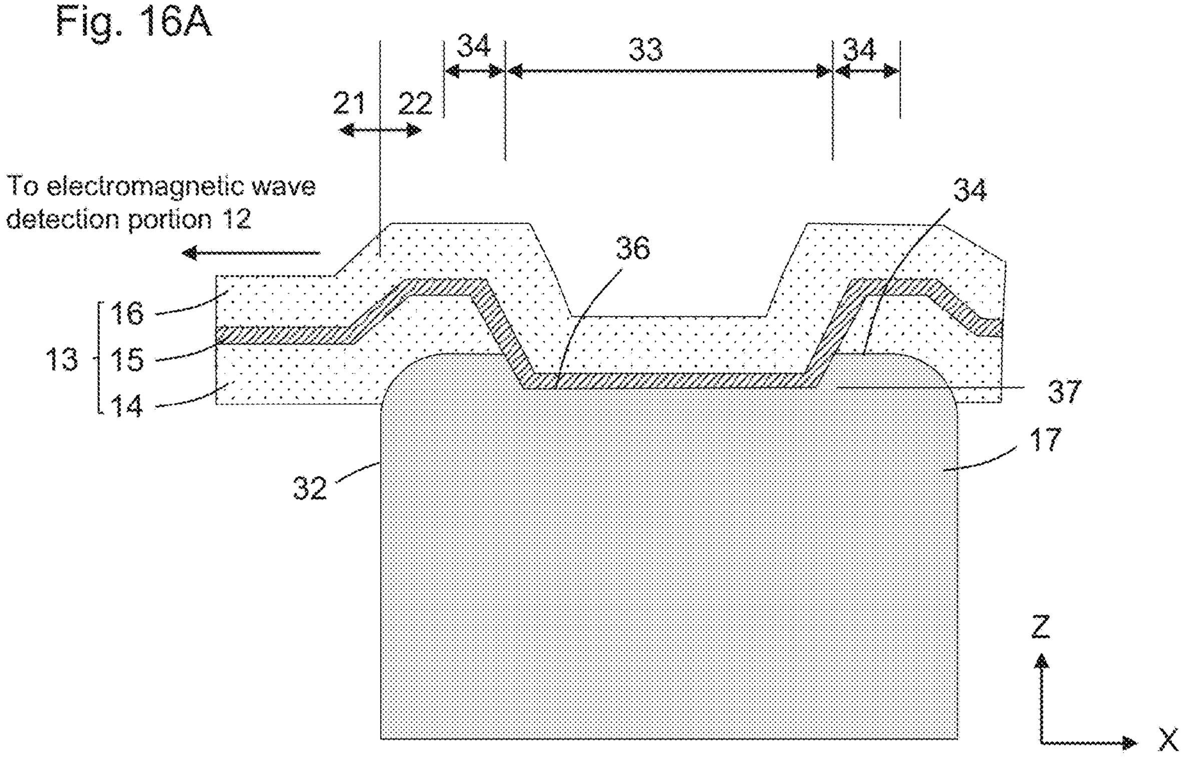
FIGS. 16A and 16B are conceptual views illustrating the configuration of the connection between a conductive pillar and the conductive layer according to a second embodiment.
Figure 16B:
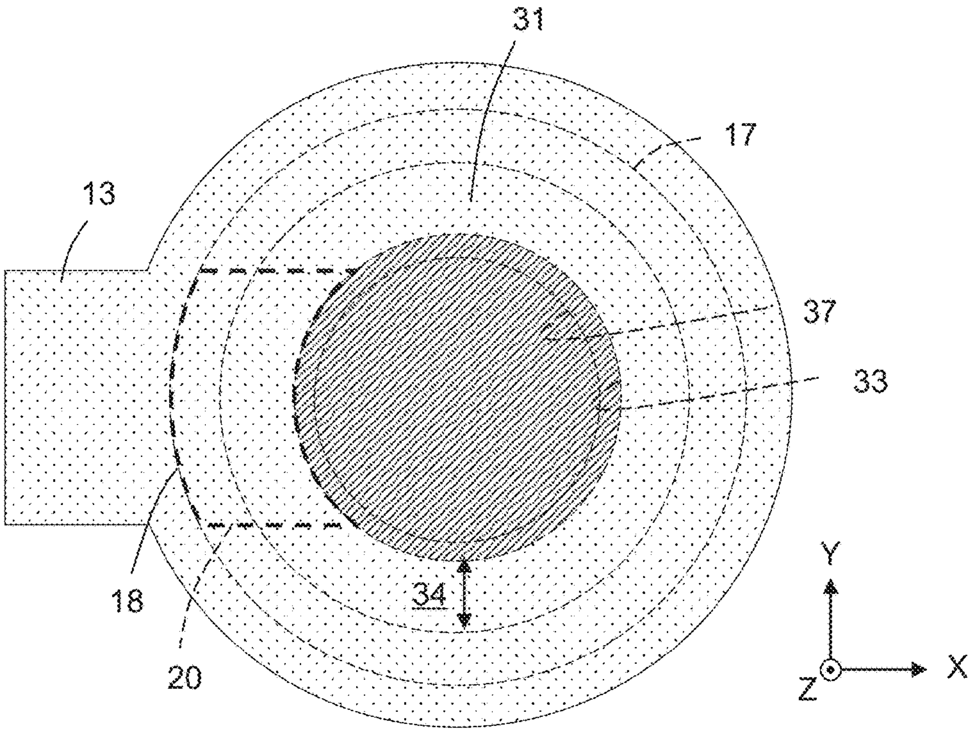

FIGS. 16A and 16B illustrate the second embodiment and correspond to FIGS. 3A and 3B. The configuration and effect, that will not be described here are the same as those of the first embodiment. Inner region 33 of end surface 31 of conductive pillar 17 has concave portion 36 that is recessed in the downward Z-direction from outer region 34, and conductive layer 15 is provided along concave portion 36 and in contact with concave portion 36. Concave portion 36 is formed on the entire surface of inner region 33, but concave portion 36 may be formed on at least a part of inner region 33. Concave portion 36 has a shape of a frustum having bottom 37 that is parallel to end surface 31 of outer region 34 but may alternatively have a bowl shape in which the depth of recession in the downward Z-direction increases toward the center of inner region 33. Concave portion 36 may be formed, for example, by milling end surface 31 of conductive pillar 17 that is formed flat. The formation of concave portion 36 may be performed at any timing after conductive pillar 17 is formed and before conductive layer 15 is deposited. For example, concave portion 36 may be formed immediately before conductive layer 15 is deposited, i.e., in the process of removing a part of first dielectric layer 14 by milling to expose end surface 31 of conductive pillar 17 (FIGS. 8A and 8B). Since conductive layer 15 is formed along concave portion 36, the contact area between conductive layer 15 and conductive pillar 17 increases and a more consistent electrical connection can be achieved. Although the depth of concave portion 36 is not particularly limited, the depth may be set such that bottom 37 of concave portion 36 is positioned between the lower surface of first dielectric layer 14 that covers linear portion 21 (the surface of first dielectric layer 14 that is opposite the surface that is in contact with linear portion 21) and outer region 34 in the Z-direction.

Third Embodiment

Figure 17A:
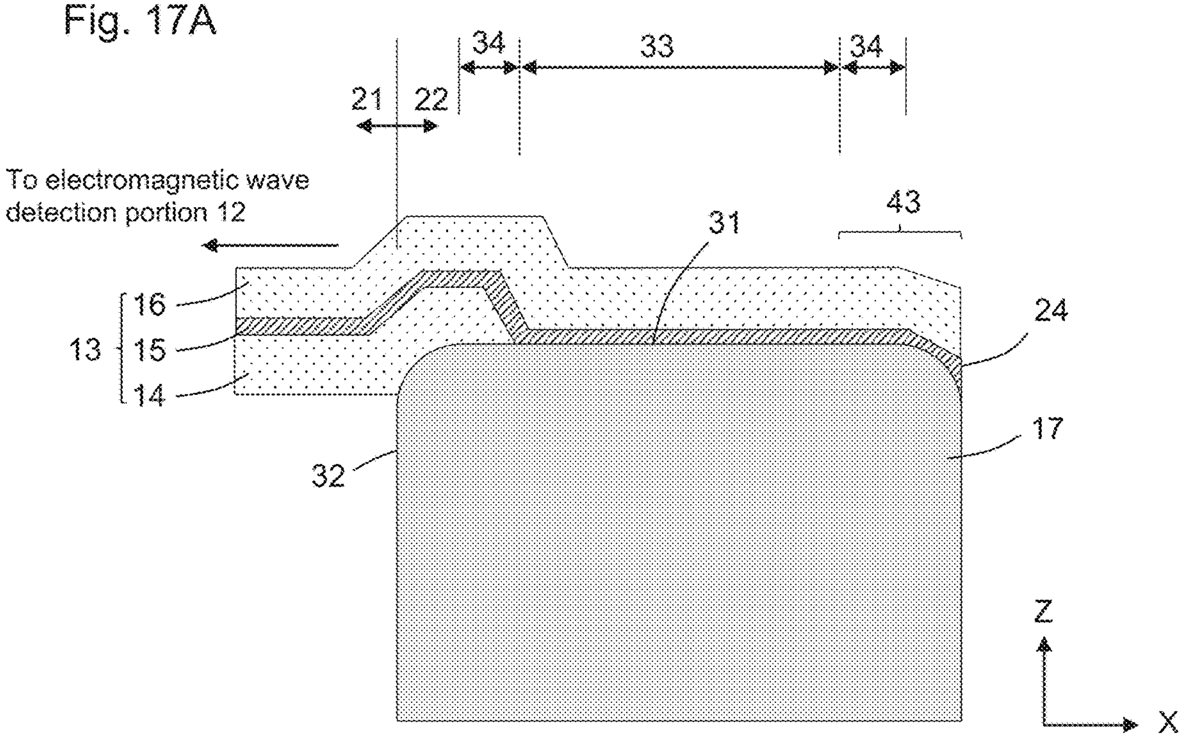
FIGS. 17A and 17B are conceptual views illustrating the configuration of the connection between a conductive pillar and the conductive layer according to a third embodiment.
Figure 17B:
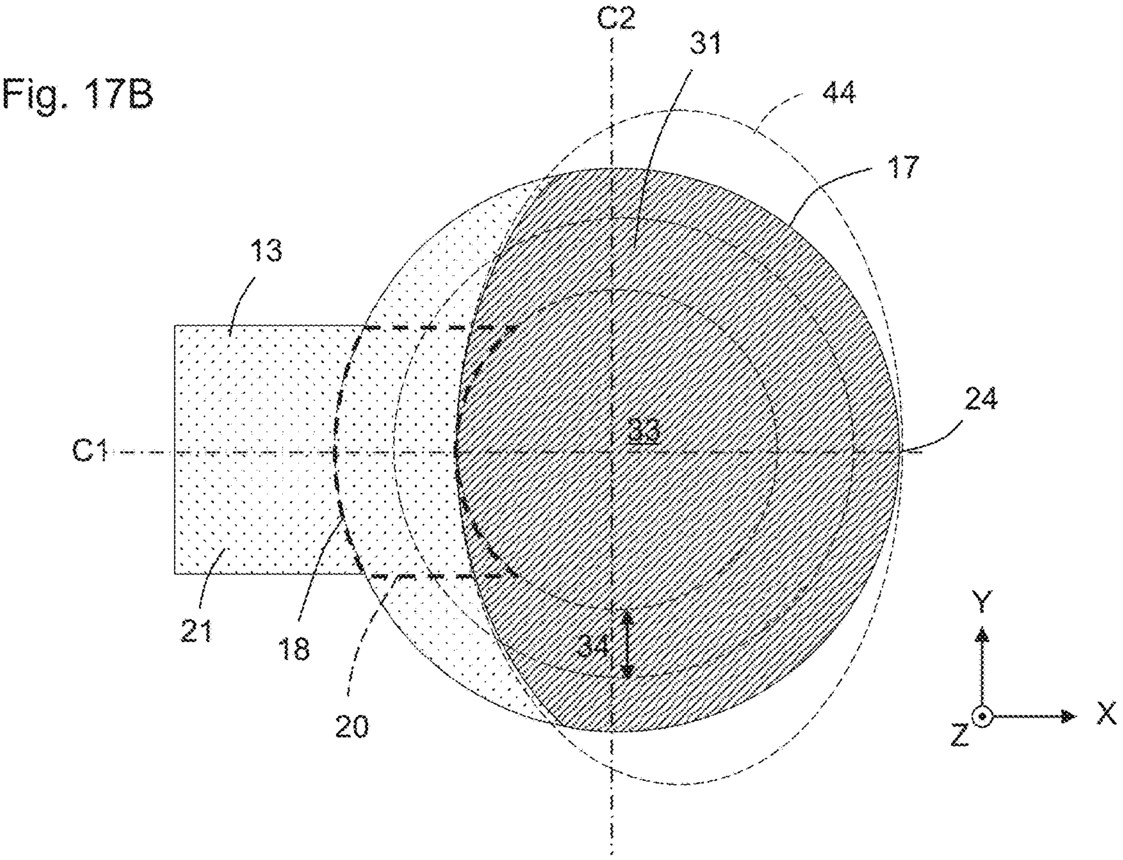

FIGS. 17A and 17B illustrate the third embodiment and correspond to FIGS. 3A and 3B. The configuration and effect that will not be described here are the same as those of the first embodiment. Second end 24 of conductive layer 15 is positioned opposite to first end 23 on the path along conductive layer 15. Second end 24 of conductive layer 15 is in contact with conductive pillar 17 and, as seen in the Z-direction, coincides with the outer circumference of conductive pillar 17. Conductive layer 15 extends between first end 23 and second end 24 and is connected to electromagnetic wave detection portion 12 at first end 23, but, for example in the first embodiment, section 43 (refer to FIG. 3A) between inner region 33 of conductive layer 15 and second end 24 does not have the function of electrically connecting electromagnetic wave detection portion 12 to conductive pillar 17. On the other hand, in the present embodiment, section 43 between inner region 33 of conductive layer 15 and second end 24 is in contact with conductive pillar 17, and a part of outer region 34 is in contact with conductive layer 15. Thus, the contact area between conductive layer 15 and conductive pillar 17 increases and a more consistent electrical connection can be achieved.

Aperture 44 shown in FIG. 17B is an aperture of a mask that is used for the process shown in FIGS. 8A and 8B, i.e., the process of removing a part of first dielectric layer 14 by milling to thereby again expose end surface 31 of conductive pillar 17. Aperture 44 of the mask faces the entire surface of inner region 33, the portion of outer region 34 other than the side of linear portion 21, and a part of the portion of side 32 near the boundary between end surface 31 and side 32 (the rounded part). The overlap between aperture 44 of the mask and conductive pillar 17 (the densely hatched part in FIG. 17B) forms the contact region between conductive layer 15 and conductive pillar 17. In the third embodiment, in contrast with the first embodiment, a dielectric layer (a part of first dielectric layer 14) is provided between a part of outer region 34 (in this example, the portion of outer region 34 other than the region that is in contact with conductive layer 15) and conductive layer 15. However, as in the first embodiment, in the third embodiment, as seen in the direction (the Z-direction) parallel to long axis C of conductive pillar 17, the dielectric layer (a part of first dielectric layer 14) that is positioned between outer region 34 and conductive layer 15 is provided at least between inner region 33 and first end 23 (region 20 in FIG. 17B) in the path along linear portion 21. Although the shape of aperture 44 of the mask is not limited to the example shown in FIG. 17B, the shape may be determined such that the entire region on the right side of linear line C2 that is perpendicular to center line C1 of linear portion 21 and that passes through the center of end surface 31 of conductive pillar 17 is included in aperture 44, and more specifically, such that when linear line C2 divides the planar shape of conductive pillar 17 in halves as seen in the Z-direction, the entire region of the half on the side of second end 24 is included in aperture 44. As a result, the contact portion between conductive layer 15 and conductive pillar 17 greatly extends toward second end 24, and as compared to the first embodiment, the contact area between conductive layer 15 and conductive pillar 17 increases.

The present embodiment may be combined with the second embodiment. For example, although not illustrated, the overlap between aperture 44 of the mask and end surface 31 of conductive pillar 17 may be concave portion 36 in FIG. 17B. In this case, concave portion 36 is formed not only in inner region 33 but also in a part of outer region 34. In other words, inner region 33 has concave portion 36 that is recessed from a part of outer region 34.

Fourth Embodiment

Figure 18A:
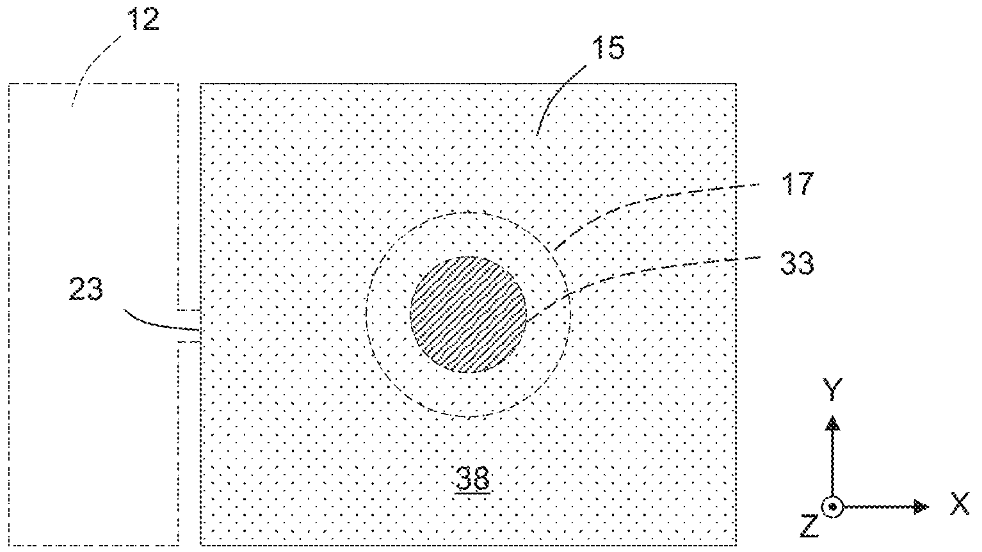
FIGS. 18A to 18C are conceptual plan views illustrating the configuration of the conductive layer according to a fourth embodiment.
Figure 18B:
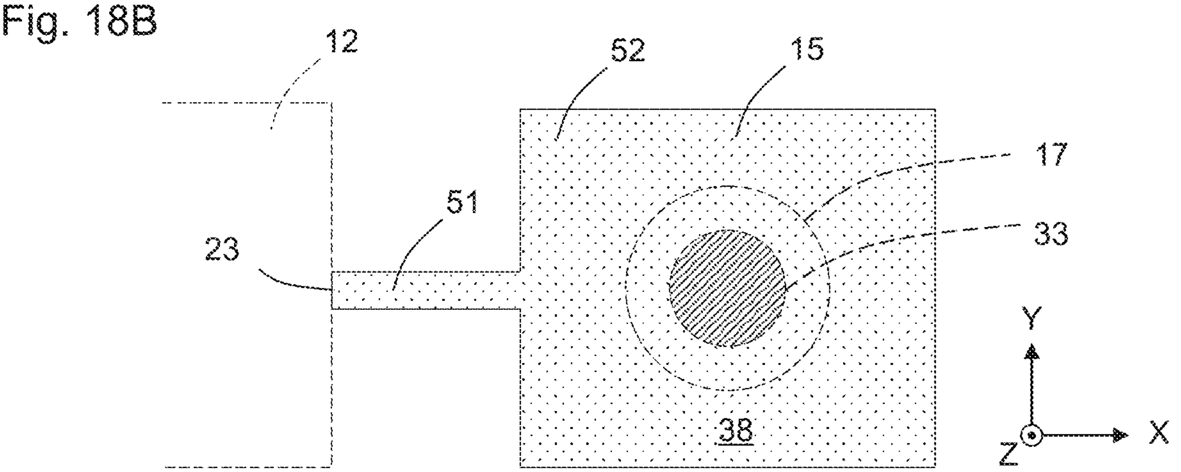
Figure 18C:
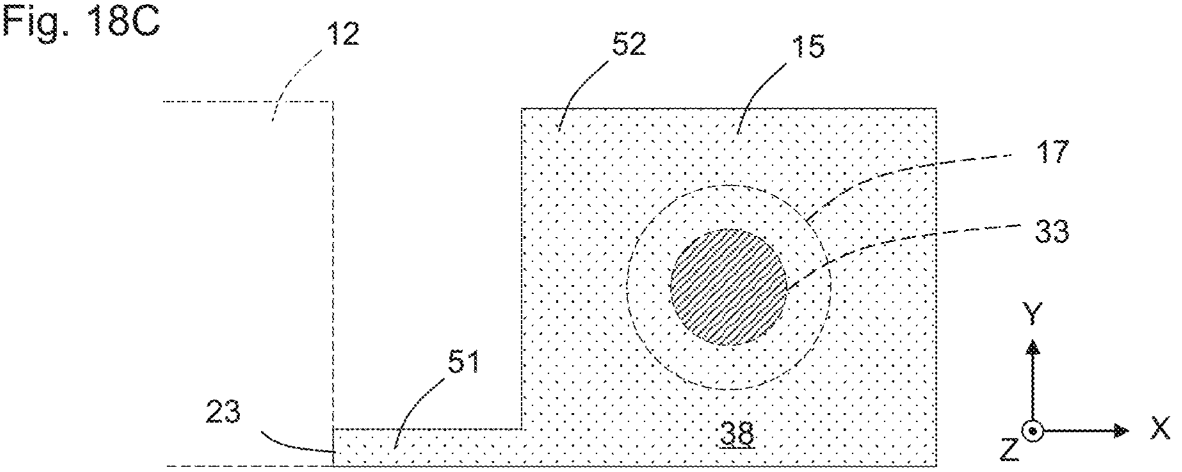

FIGS. 18A to 18C are plan views conceptually illustrating the configuration of conductive layer 15 in the fourth embodiment. In the previously described embodiments, conductive layer 15 has linear portion 21 that extends from first end 23 to conductive pillar 17, but in the present embodiment, conductive layer 15 is provided two-dimensionally at least near conductive pillar 17. The contact region between conductive layer 15 and conductive pillar 17 coincides with inner region 33 of end surface 31 of conductive pillar 17 as in the first embodiment.

In the example shown in FIG. 18A, conductive layer 15 two-dimensionally extends from first end 23 to conductive pillar 17. In the example shown in FIGS. 18B and 18C, conductive layer 15 has linear portion 51 that extends from first end 23 and two-dimensional body 52 that is connected to linear portion 51 and that extends to conductive pillar 17. In the example shown in FIG. 18B, linear portion 51 is connected to the center of one of the sides of two-dimensional body 52. In the example shown in FIG. 18C, linear portion 51 is connected to an edge of two-dimensional body 52. Linear portion 51 is linear but may be meandering as in FIGS. 2A and 2B, and the shape of linear portion 51 is not limited. Similarly, the shape of two-dimensional body 52 is not limited. In any one of the examples, in a projection image onto a projection plane, the projection plane including outer region 34, and the projection image obtained by projecting conductive layer 15 in a direction (the Z-direction) that is parallel to long axis C of conductive pillar 17 (refer to FIG. 2A), conductive layer 15 has peripheral region 38 that is in contact with the outer circumference of outer region 34 around the entire circumference of outer region 34.

Although certain embodiments of the present disclosure have been shown and described in detail, it should be understood that various changes and modifications may be made without departing from the spirit or scope of the appended claims.

LIST OF REFERENCE NUMERALS

1 electromagnetic wave sensor (infrared sensor)
11 electromagnetic wave detection element
12 electromagnetic wave detection portion
12A temperature detection element
12B electromagnetic wave absorbing body (dielectric layer)
13 wiring layer
14 first dielectric layer
15 conductive layer
16 second dielectric layer
17 conductive pillar
23 first end
24 second end
31 end surface of the conductive pillar
33 inner region of the end surface
34 outer region of the end surface
36 concave portion

The invention claimed is:

1. An electromagnetic wave detection element comprising:

an electromagnetic wave detection portion;

a conductive layer that is electrically connected to the electromagnetic wave detection portion;

a conductive pillar having an end surface that is electrically connected to the conductive layer, wherein the end surface includes an inner region that is in contact with the conductive layer and an outer region that is positioned outside the inner region; and a dielectric layer that is positioned between at least a part of the outer region and the conductive layer.

2. The electromagnetic wave detection element according to claim 1, wherein the inner region of the end surface has a concave portion that is recessed from at least a part of the outer region, and the conductive layer is provided along the concave portion.

3. The electromagnetic wave detection element according to claim 1, wherein the conductive layer has a linear portion that has a first end that is connected to the electromagnetic wave detection portion and that linearly extends from the first end, wherein as seen in a direction that is parallel to a long axis of the conductive pillar, the dielectric layer is positioned between the inner region and the first end in a path along the linear portion.

4. The electromagnetic wave detection element according to claim 3, wherein the dielectric layer is provided between a portion of the outer region that is positioned around an entire circumference of the outer region and the conductive layer.

5. The electromagnetic wave detection element according to claim 3, wherein the conductive layer has a second end that is positioned opposite to the first end, and the second end is in contact with the outer region.

6. The electromagnetic wave detection element according to claim 1, wherein in a projection image onto a projection plane that includes the outer region, the projection image being obtained by projecting the conductive layer in a direction parallel to a long axis of the conductive pillar, the conductive layer has a peripheral region that is in contact with an outer circumference of the outer region around an entire circumference of the outer region.

7. The electromagnetic wave detection element according to claim 1, wherein the electromagnetic wave detection portion includes a temperature detection element and an electromagnetic wave absorbing body that covers at least a part of the temperature detection element.

8. The electromagnetic wave detection element according to claim 1, further comprising a side dielectric layer that faces a side of the conductive pillar and that is integrated with the dielectric layer.

9. An electromagnetic wave sensor comprising the electromagnetic wave detection element according to claim 1.

10. An electromagnetic wave sensor comprising more than one of the electromagnetic wave detection element according to claim 1, wherein the electromagnetic wave detection elements are arranged in an array.

11. The electromagnetic wave detection element according to claim 1, wherein the end surface of the conductive pillar is circular and flat.

12. The electromagnetic wave detection element according to claim 1, wherein a gap is provided between the outer region of the end surface of the conductive pillar and the conductive layer, and the gap is filled by the dielectric layer.

13. The electromagnetic wave detection element according to claim 1, wherein the inner region of the end surface of the conductive pillar is circle shaped.

14. The electromagnetic wave detection element according to claim 13, wherein the inner region of the end surface of the conductive pillar is concentric with the end surface of the conductive pillar.

15. The electromagnetic wave detection element according to claim 1, wherein the conductive layer physically contacts the conductive pillar.

16. The electromagnetic wave detection element according to claim 1, wherein the outer region of the end surface of the conductive pillar surrounds the inner region of the end surface of the conductive pillar.

17. The electromagnetic wave detection element according to claim 1, wherein the dielectric layer is composed of aluminum nitride, silicon nitride, aluminum oxide, or silicon oxide.

* * * * *